United States Patent
Hauler

(10) Patent No.: US 6,657,537 B1
(45) Date of Patent: Dec. 2, 2003

(54) DEVICE FOR INITIATING AN AUTHORIZATION REQUEST FOR A VEHICLE

(75) Inventor: Peter Hauler, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,143

(22) PCT Filed: Feb. 3, 1999

(86) PCT No.: PCT/DE99/00279
§ 371 (c)(1),
(2), (4) Date: Oct. 2, 2000

(87) PCT Pub. No.: WO99/41475
PCT Pub. Date: Aug. 19, 1999

(30) Foreign Application Priority Data

Feb. 12, 1998 (DE) .......................................... 198 05 659

(51) Int. Cl.⁷ .............................................. G05B 19/00
(52) U.S. Cl. ................... 340/5.62; 340/5.61; 340/5.64; 340/5.72; 340/539.1; 340/5.1; 340/5.2; 307/10.1; 70/207; 70/208; 70/278.1; 180/287
(58) Field of Search ............................ 340/5.62, 5.61, 340/5.64, 5.72, 539, 5.1; 307/10.1; 70/207, 208, 256, 276, 278.1; 180/287

(56) References Cited

U.S. PATENT DOCUMENTS

| | | | | |
|---|---|---|---|---|
| 4,688,036 A | * | 8/1987 | Hirano et al. | 340/5.62 |
| 4,835,533 A | * | 5/1989 | Akutsu | 340/5.3 |
| 4,897,644 A | * | 1/1990 | Hirano | 340/5.62 |
| 4,983,947 A | * | 1/1991 | Mullen et al. | 340/426 |
| 5,134,392 A | * | 7/1992 | Takeuchi et al. | 340/5.62 |

FOREIGN PATENT DOCUMENTS

| | | |
|---|---|---|
| DE | 1 018 746 | 10/1957 |
| DE | 196 33 894 | 2/1998 |
| EP | 0 153 467 | 9/1985 |
| EP | 0 218 251 | 4/1987 |
| EP | 0 346 317 | 12/1989 |
| FR | 2 589 187 | 4/1987 |
| WO | WO 98 04799 | 2/1998 |

* cited by examiner

Primary Examiner—Michael Horabik
Assistant Examiner—Yves Dalencourt
(74) Attorney, Agent, or Firm—Kenyon & Kenyon

(57) ABSTRACT

A device for initiating an authorization request for a vehicle includes a first switching arrangement, whose operation initiates an authorization request. The first switching arrangement is disposed in a recess of a door handle of the vehicle so that the recess houses a switching surface of the first switching arrangement.

26 Claims, 3 Drawing Sheets

DEVICE FOR INITIATING AN AUTHORIZATION REQUEST FOR A VEHICLE

FIELD OF THE INVENTION

The present invention relates to a device for initiating an authorization request for a vehicle.

BACKGROUND INFORMATION

A safety device for motor vehicles is referred to in European Patent Application No. 0 218 251. As referred to, a stationary transponder installed on the motor vehicle generates a question code signal based on a switching signal, which is generated using a manually operable switch. A portable transponder receives the question code signal and emits an answer code signal in response. The motor vehicle can be unlocked when the answer code signal matches an expected code signal. The switch is operated through the door handle of the motor vehicle.

SUMMARY OF THE INVENTION

The device according to an exemplary embodiment of the present invention for initiating an authorization request for a vehicle has a first switching arrangement, the operation of which initiates an authorization request. The first switching arrangement is disposed in a door handle of the vehicle. In addition, the device according to the present invention includes a recess housing a switching surface of the first switching arrangement and is provided in the door handle. To initiate the authorization request, it is not necessary to install a switch in the body or the vehicle door. The release mechanism is integrated in the door handle. Thanks to the switching arrangement being accommodated in a recess, it is believed to be substantially protected from environmental influences, such as freezing or intentional damage. Furthermore, it is believed that the device according to an exemplary embodiment of the present invention offers increased protection against unintentional and inadvertent operation of the switch for initiating the authorization request, since the recessed accommodation of the switching arrangement only allows a switching function to be triggered in purposeful operation. It is also possible to initiate the authorization request in the case of fixed door handles.

In another exemplary embodiment, the recess is disposed on the side facing away from the vehicle. The first switching arrangement initiates an authorization request for locking the vehicle. The user must operate the first switching arrangement in the direction towards the vehicle, in order to lock it. This moving direction corresponds to the one used for closing the vehicle door. However, the side of the door handle facing the vehicle is normally used to open the vehicle door. Therefore, the probability of inadvertently operating the locking switch upon opening the vehicle door is believed to be relatively small with the chosen structural design of the door handle.

A further development provides a second switching arrangement, whose operation initiates an authorization request for unlocking the vehicle. To this end, an additional recess accommodating a switching surface of the second switching arrangement is integrated in the door handle. In a state of non-operation, this switching surface of the second switching arrangement protrudes from the upper surface of the door handle. The switching surface is disposed on the side of the door handle facing the vehicle. The unlocking request is started by pulling on the door handle and actuating the switching surface in the same direction. This operation of the switch corresponds to the usual sequence of movements in opening the door.

Magnetic switches, e.g. Reed switches, may be used as a switching arrangement. These are believed to have the advantage of not requiring closed-circuit current. The permanent magnet triggering the Reed contact may be disposed in the switching surface of the switching arrangement.

DETAILED DESCRIPTION

Figure 1:
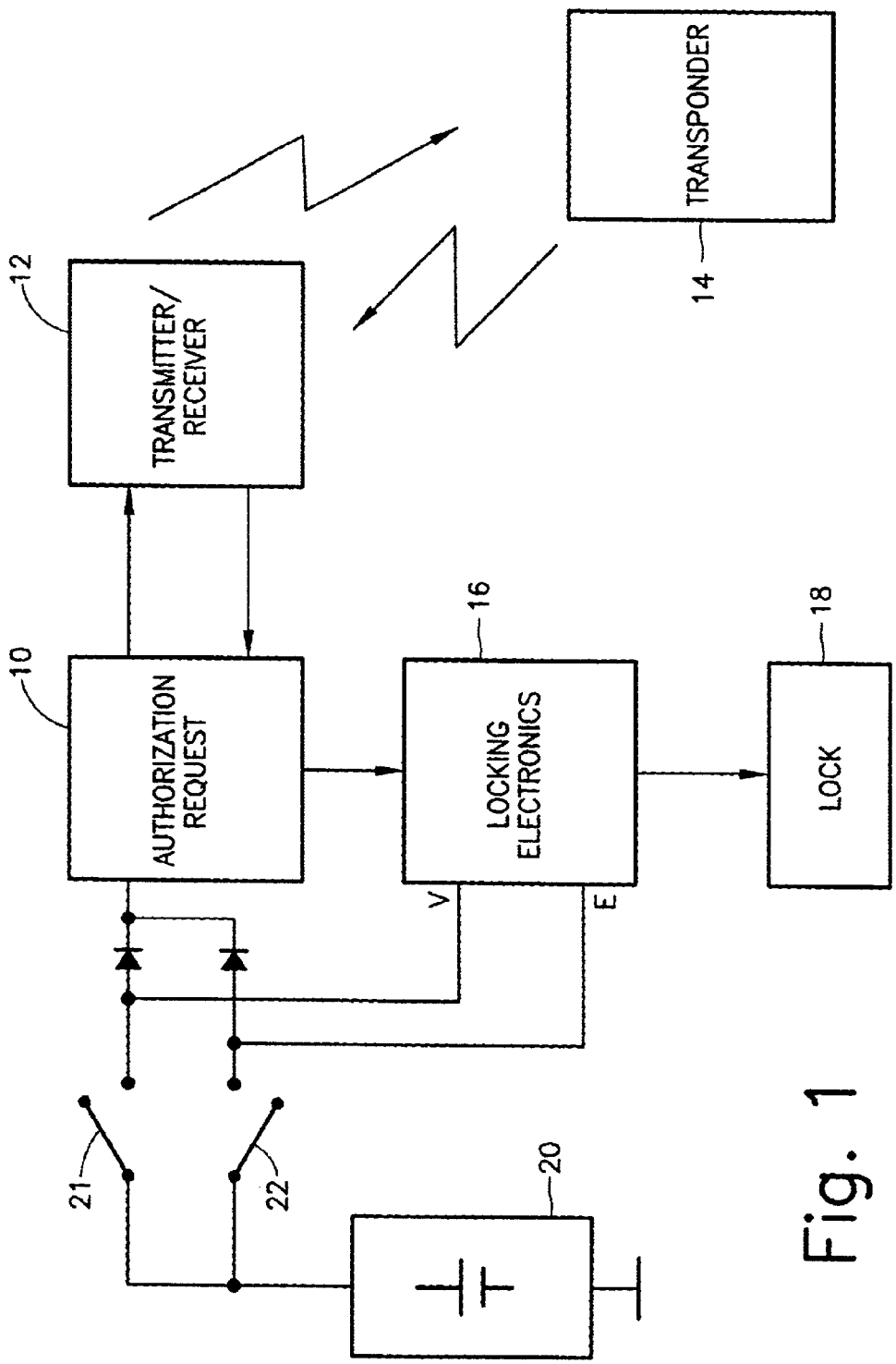
FIG. 1 shows an exemplary arrangement for initiating an authorization request for a vehicle.

FIG. 1 shows an exemplary arrangement for initiating an authorization request for a vehicle.

A power supply 20 supplies electricity to a first switching arrangement 21 and a second switching means 22. Their output signals are coupled by diodes and supplied to an authorization request block 10. Authorization request 10 exchanges signals with a transmitting/receiving arrangement 12, which communicates with a transponder 14 in a wireless manner. The output signals of switching arrangement 21, 22 and an output signal of authorization request block 10 are supplied to door-lock electronics 16. Door-lock electronics 16 generate a control signal for a lock 18.

Figure 2:
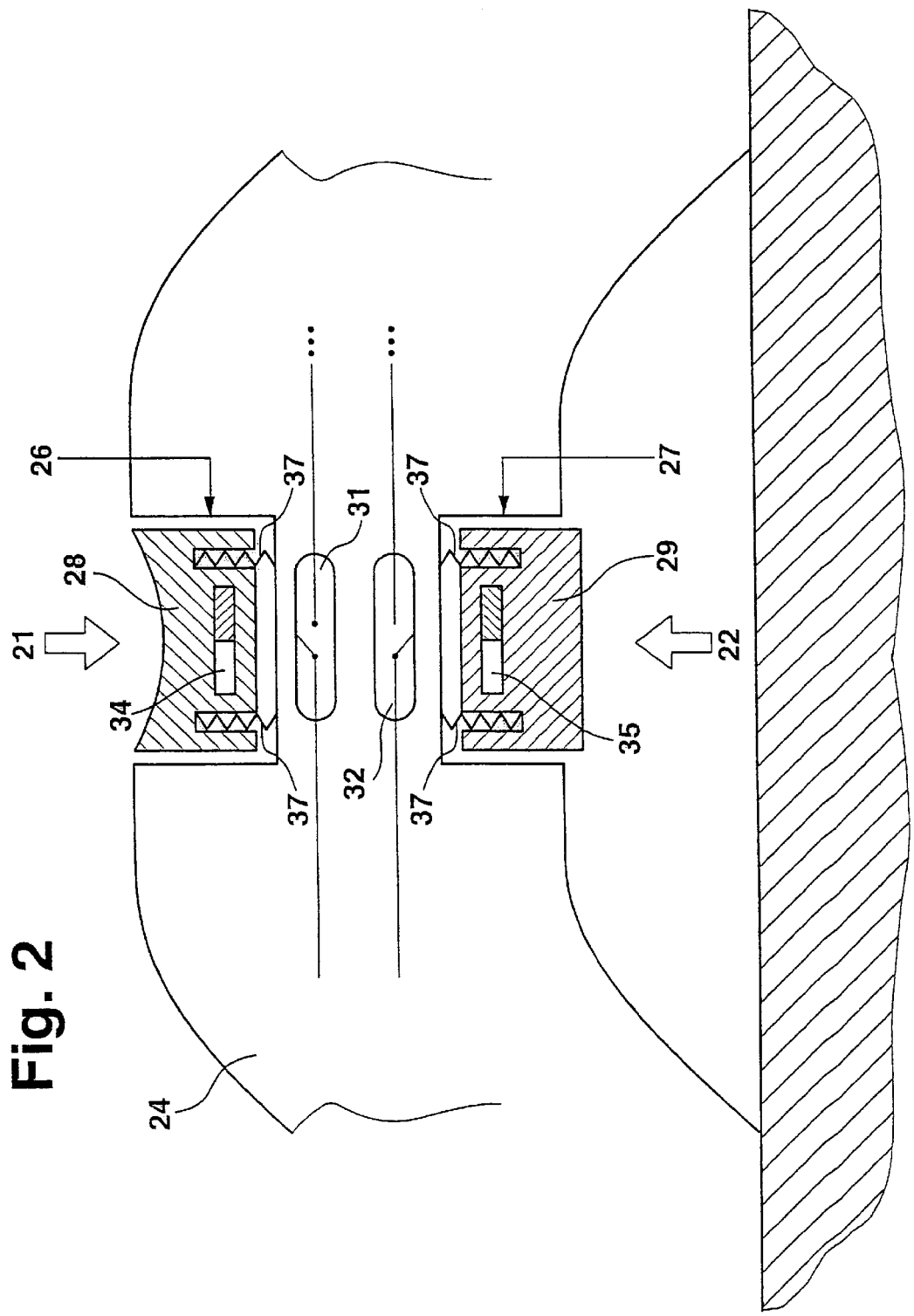
FIG. 2 shows a switching arrangement for use with the exemplary arrangement of FIG. 1.

FIG. 2 shows a plan view of a section through a door handle 24. The side of door handle 24 facing away from the vehicle has a first rectangular recess 26. A first switching surface 28 is housed in first recess 26, the former being movably supported with respect to door handle 24, by springs 37. In an unactuated state, first switching surface 28 is arranged so as to be slightly recessed in relation to the upper surface of door handle 24. The first switching surface has a permanent magnet 34, which operates a first Reed contact 31 in response to being sufficiently close to it. This set-up constitutes first switching arrangement 21. A rectangular, second recess 27 accommodating a second switching surface 29 is located on the side of door handle 24 facing the vehicle. The second switching surface contains a second permanent magnet 35, and is movably supported with respect to door handle 24, by springs 37. However, second switching surface 29 protrudes from the upper surface of door handle 24, in the direction of the vehicle. A second Reed contact 32 is closed by pressing second switching surface 29. The last described set-up constitutes second switching arrangement 22. The arrows indicate the actuating direction of both switching arrangement 21, 22, which lead to authorization request 10 being triggered for locking or unlocking the door, or lead to an already unlocked door being directly opened by bypassing authorization request 10.

Figure 3:
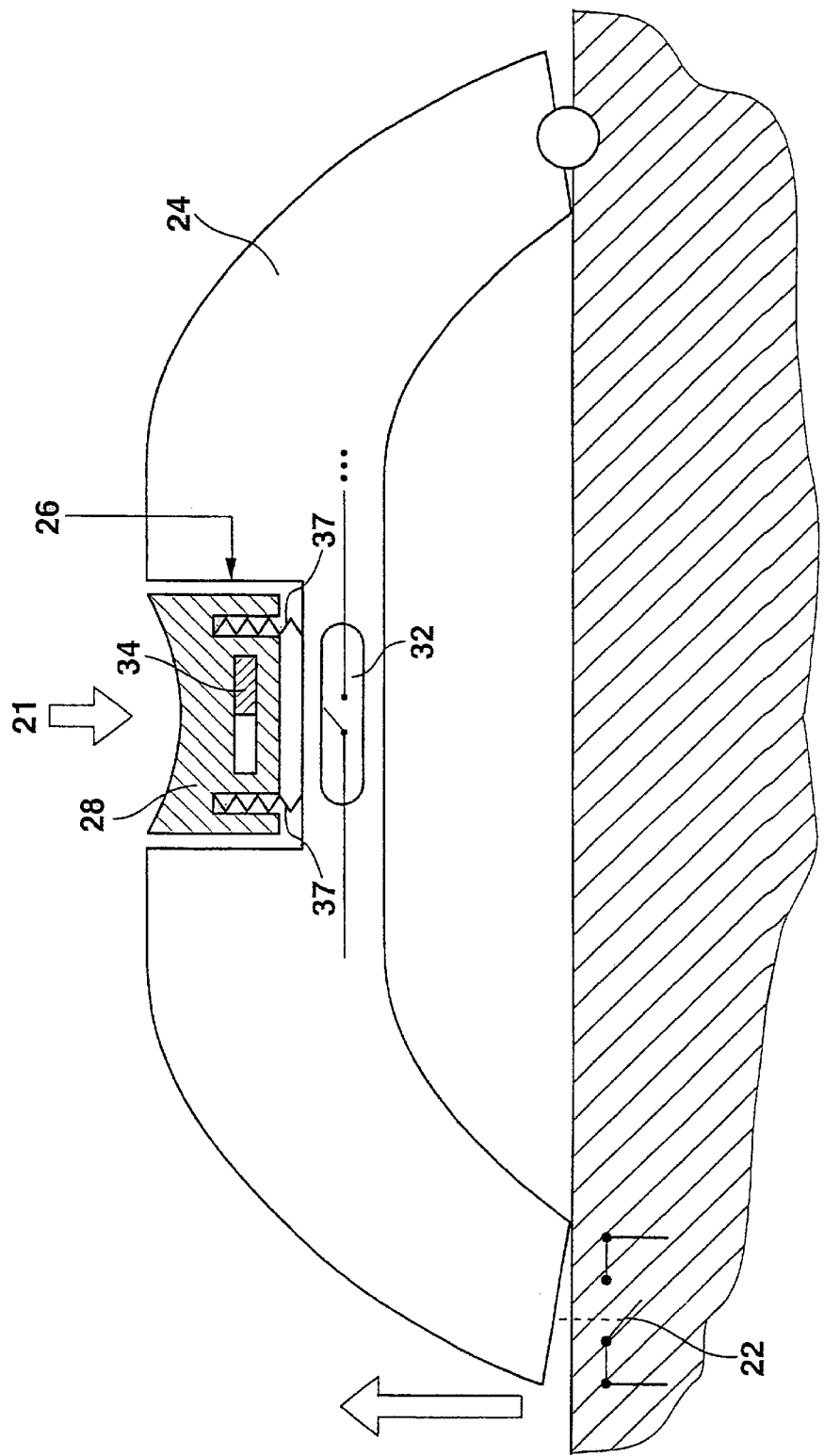
FIG. 3 shows another exemplary switching arrangement for use with the exemplary arrangement of FIG. 1.

The exemplary embodiment shown in FIG. 3 only has first switching arrangement 21 in door handle 24, the design of the first switching arrangement being identical to that described in FIG. 2. Door handle 24 is pivoted on one side. Switching arrangement 22, which is disposed in the vehicle body, is controlled in response to operating door handle 24.

Operating first switching arrangement 21 initiates a locking or securing operation of the vehicle, and operating second switching arrangement 22 initiates an unlocking or opening operation of the vehicle. The user would like to lock the vehicle after getting out of it. To this end, he or she actuates first switching arrangement 21 into its locking position. This connects authorization request 10 to the supply voltage. This signal change is interpreted as a desired start of authorization request 10. It is recognized from the data communication between transmitting/receiving part 12 and transponder 14, whether or not the vehicle user operating first switching arrangement 21 is also actually authorized to initiate a locking operation. For example, identification procedures used for this purpose fall back upon the so-called Rolling Code Method or the so-called Challenge Response Method. Along these lines, authorization request 10 controls (causes) transmitting/receiving part 12 to emit a question signal. Transponder 14 receives this question signal, ascertains the appropriate answer signal from it, and transmits the answer signal back to transmitting/receiving part 12. Authorization request 10 compares the received answer signal with an expected setpoint signal. If the two are consistent, authorization request 10 recognizes transponder 14 as being authorized to lock the vehicle. An analog identification procedure is used in unlocking the vehicle.

Locking electronics 16 generate the appropriate locking signals for lock 18, when transponder 14 is recognized as being authorized.

A corresponding procedure is followed, when one wishes to unlock and/or open the vehicle. Authorization request 10 is once again started by closing second switch 22. When transponder 14 is authorized, locking electronics 16 generate the appropriate control signals for initiating an unlocking and/or opening operation of lock 18 or the locking system of the vehicle. According to the exemplary embodiment shown in FIG. 2, both switching arrangement 21, 22 are designed as Reed switches. A first recess 26 accommodating first switching surface 28 is provided on the side of door handle 24 facing away from the vehicle. In an unactuated state, the upper surface of first switching surface 28 is slightly recessed in comparison with the surrounding upper surface of door handle 24. This can reduce the risk of unintentionally initiating a locking operation by inadvertently contacting first switching surface 28. By actuating first switching surface 28 in the direction towards the vehicle, first Reed contact 31 is closed due to first permanent magnet 34 approaching it. The previously described locking operation follows. After first switching surface 28 is actuated, springs 37 move it back into the original position.

Second switching arrangement 22, which is used for initiating the unlocking and/or opening operation, is disposed on the inner side of door handle 24 facing the vehicle. Second recess 27 houses second switching surface 29, which is constructed identically to first switching surface 28. However, second switching surface 29 protrudes from the upper surface of door handle 24 in the direction of the vehicle, when the second switching surface is in an idle state. Second Reed contact 32 is closed by actuating second switching surface 29 in a direction away from the vehicle. The unlocking and/or opening procedure is initiated in a previously described manner. In the exemplary embodiment shown in FIG. 2, door handle 24 is fixed. This does not allow the locking bolt to be mechanically actuated.

The vehicle is in an unlocked state, when authorization request 10 is passed through successfully. If the user operates second switching arrangement 22 one more time in the unlocked state, authorization request 10 is not started again, but rather is bypassed to immediately open the door.

On the other hand, door handle 24 of the exemplary embodiment shown in FIG. 3 is movably supported. First switching arrangement 21 is used to initiate a locking operation, and conforms with first switching arrangement 21 shown in FIG. 2. However, second switching arrangement 22 is in the body or door of the vehicle. Second switching arrangement 22 is closed in response to door handle 24 being actuated in a direction away from the vehicle, and thereby initiates the previously described unlocking and/or opening operation. Apart from actuating second switching arrangement 22, pulling door handle 24 moves the rotating bolt of the door lock, via the mechanical coupling, to open the door.

Switches not having, or only having a small closed-circuit current should preferably be used as switching arrangement 21, 22. A Reed switch is indeed an option; however, capacitive, mechanical (microswitches), and magnetic (Hall) switches would also be possible.

In order to avoid discharging the vehicle battery when switchinq arrangement 21, 22 are actuated repeatedly, authorization request block 10 can have a counter that is compared to a limiting value. Additional authorization requests 10 are no longer executed when the limiting value is exceeded.

The devices according to the exemplary embodiments of the present inventions may be used in keyless access systems for vehicles. However, they are not limited hereto.

What is claimed is:

1. A device for initiating an authorization request for use in a vehicle having a door handle, the device comprising:

a first switching arrangement, an actuation of which initiates an authorization request, wherein the first switching arrangement is disposed in a recess in the door handle of the vehicle so that the recess houses a switching surface of the first switching arrangement;

wherein in an unactuated state of the first switching arrangement, the switching surface of the first switching arrangement is recessed compared to an upper surface of the door handle.

2. The device of claim 1, wherein the recess is disposed on a side of the door handle facing away from the vehicle.

3. The device of claim 1, wherein the authorization request is for locking the vehicle.

4. The device of claim 1, wherein another recess in the door handle houses another switching surface of the second switching arrangement, the another recess being provided on a side of the door handle facing the vehicle.

5. The device of claim 1, wherein the first switching arrangement includes at least one of a magnetic switch, a Reed switch, a capacitive switch, and a mechanical switch.

6. The device of claim 5, wherein a permanent magnet is disposed in the switching surface, the switching surface being movable relative to the door handle.

7. The device of claim 1, further comprising:

a second switching arrangement, wherein actuation of the second switching arrangement initiates another authorization request for unlocking the vehicle.

8. The device of claim 1, wherein in an unactuated state of the second switching arrangement, the another switching surface extends above an upper surface of the door handle.

9. The device of claim 1, wherein the recess is disposed on a side of the door handle facing away from the vehicle, and the authorization request is for locking the vehicle.

10. The device of claim 1, wherein the second switching arrangement is actuated by moving the door handle.

11. The device of claim 1, wherein the authorization request is bypassed to control a lock in response to an actuation of the second switching arrangement.

12. A device for initiating an authorization request for use in a vehicle having a door handle, the device comprising:

a first switching arrangement, an actuation of which initiates an authorization request, wherein the first switching arrangement is disposed in a recess in the door handle of the vehicle so that the recess houses a switching surface of the first switching arrangement; and a second switching arrangement, wherein actuation of the second switching arrangement initiates another authorization request for unlocking the vehicle;

wherein another recess in the door handle houses another switching surface of the second switching arrangement, the another recess being provided on a side of the door handle facing the vehicle.

13. The device of claim 12, wherein in an unactuated state of the first switching arrangement, the switching surface of the first switching arrangement is recessed compared to an upper surface of the door handle.

14. The device of claim 12, wherein in an unactuated state of the second switching arrangement, the another switching surface extends above an upper surface of the door handle.

15. The device of claim 12, wherein the second switching arrangement is actuated by moving the door handle.

16. The device of claim 12, wherein the recess is disposed on a side of the door handle facing away from the vehicle.

17. The device of claim 12, wherein the authorization request is for locking the vehicle.

18. The device of claim 12, wherein the first switching arrangement includes at least one of a magnetic switch, a Reed switch, a capacitive switch, and a mechanical switch.

19. The device of claim 18, wherein a permanent magnet is disposed in the switching surface, the switching surface being movable relative to the door handle.

20. A device for initiating an authorization request for use in a vehicle having a door handle, the device comprising:

a first switching arrangement, an actuation of which initiates an authorization request, wherein the first switching arrangement is disposed in a recess in the door handle of the vehicle so that the recess houses a switching surface of the first switching arrangement; and a second switching arrangement, wherein actuation of the second switching arrangement initiates another authorization request for unlocking the vehicle;

wherein the authorization request is bypassed to control a lock in response to an actuation of the second switching arrangement.

21. A device for initiating an authorization request for use in a vehicle having a door handle, the device comprising:

a first switching arrangement, an actuation of which initiates an authorization request, wherein the first switching arrangement is disposed in a recess in the door handle of the vehicle so that the recess houses a switching surface of the first switching arrangement; and a second switching arrangement, wherein actuation of the second switching arrangement initiates another authorization request for unlocking the vehicle;

wherein in an unactuated state of the first switching arrangement, the switching surface of the first switching arrangement is recessed compared to an upper surface of the door handle, wherein another recess in the door handle houses another switching surface of the second switching arrangement, the another recess being provided on a side of the door handle facing the vehicle, and wherein the recess is disposed on a side of the door handle facing away from the vehicle.

22. The device of claim 21, wherein in an unactuated state of the second switching arrangement, the another switching surface extends above an upper surface of the door handle.

23. The device of claim 21, wherein the first switching arrangement includes at least one of a magnetic switch, a Reed switch, a capacitive switch, and a mechanical switch.

24. The device of claim 21, wherein a permanent magnet is disposed in the switching surface, the switching surface being movable relative to the door handle.

25. The device of claim 21, wherein the second switching arrangement is actuated by moving the door handle.

26. The device of claim 21, wherein the authorization request is bypassed to control a lock in response to an actuation of the second switching arrangement.

* * * * *

UNITED STATES PATENT AND TRADEMARK OFFICE
CERTIFICATE OF CORRECTION

PATENT NO. : 6,657,537 B2
DATED : December 2, 2003
INVENTOR(S) : Hauler et al.

It is certified that error appears in the above-identified patent and that said Letters Patent is hereby corrected as shown below:

Column 2,
Line 24, change "switching means 22." to -- switching arrangement 22 --;
Line 26, change "Authorization request 10" to -- Authorization request block 10 --;
Line 29, change "switching arrangement 21, 22" to -- switching arrangements 21, 22 --; and Column 4,
Line 17, change "switching arrangement 21, 22" to -- switching arrangements 21, 22 --.

Signed and Sealed this

Fourteenth Day of December, 2004

JON W. DUDAS
*Director of the United States Patent and Trademark Office*